United States Patent [19]
Petrie

[11] 4,256,010
[45] Mar. 17, 1981

[54] BEVELED RETAINING RING AND METHOD FOR CONSTRUCTING THE SAME

[76] Inventor: John A. Petrie, 16 Weebetook La., Cincinnati, Ohio 45208

[21] Appl. No.: 35,420

[22] Filed: May 2, 1979

Related U.S. Application Data

[62] Division of Ser. No. 882,637, Mar. 2, 1978, Pat. No. 4,184,242.

[51] Int. Cl.³ .............................................. F16B 21/18
[52] U.S. Cl. ..................................... 411/518; 10/86 B
[58] Field of Search ...................... 85/8.8, 8.6, 8.9, 36; 403/375; 10/86 B, 86 F; 113/116 H

[56] References Cited
U.S. PATENT DOCUMENTS

| | | | |
|---|---|---|---|
| 1,758,515 | 5/1930 | Heiermann | 85/8.8 X |
| 2,544,631 | 3/1951 | Heimann et al. | 85/8.8 |
| 2,595,787 | 5/1952 | Heimann | 85/8.8 |
| 2,886,382 | 5/1959 | Baublys | 85/8.8 |

FOREIGN PATENT DOCUMENTS

| | | | |
|---|---|---|---|
| 92240 | 10/1959 | Netherlands | 85/8.8 |
| 627059 | 7/1949 | United Kingdom | 85/8.8 |
| 1441467 | 6/1976 | United Kingdom | 85/8.8 |

*Primary Examiner*—Ramon S. Britts

[57] ABSTRACT

A split beveled retaining ring and method for constructing the same is characterized by a beveled groove seating flange being formed by bending the radially inner or outer edge portion of a split ring body at an angle to the plane of the ring body. The part abutment surface of the ring body may be maintained in substantially the same plane as the terminal portion of the bent beveled flange either by indenting the ring body to form a new part abutment surface or by bending the groove seating flange twice in opposite directions.

10 Claims, 4 Drawing Figures

U.S. Patent        Mar. 17, 1981        4,256,010
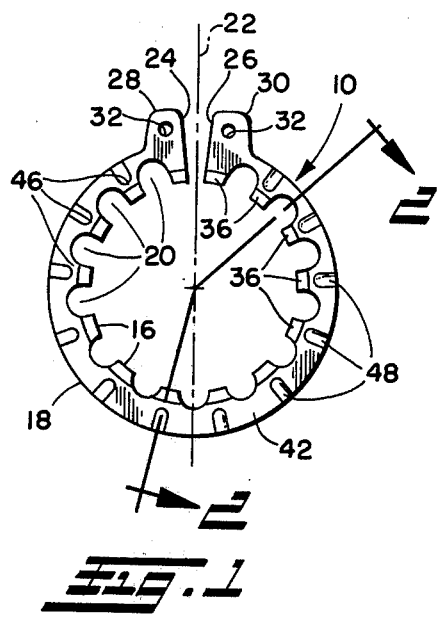
_Fig. 1_
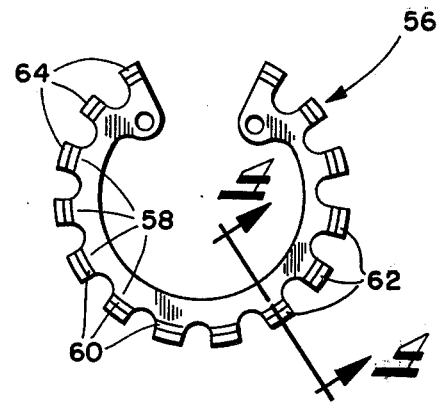
_Fig. 3_
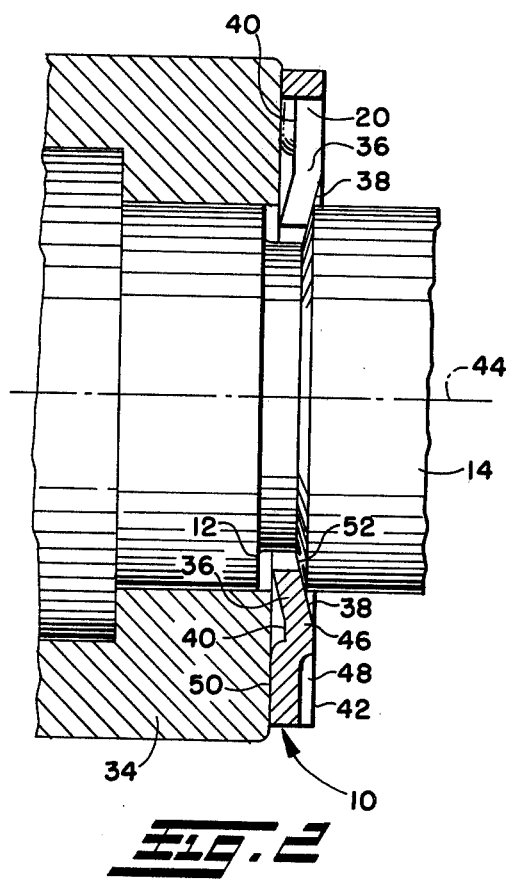
_Fig. 2_
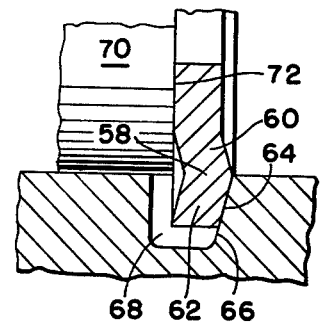
_Fig. 4_

BEVELED RETAINING RING AND METHOD FOR CONSTRUCTING THE SAME

CROSS REFERENCE TO RELATED APPLICATIONS

This application is a division of U.S. application Ser. No. 882,637, filed Mar. 2, 1978, now U.S. Pat. No. 4,184,242, granted Jan. 22, 1980.

BACKGROUND OF THE INVENTION

This invention as generally indicated above relates to split, beveled retaining rings and their method of manufacture.

Split beveled retaining rings are used to provide rigid end-play takeup in machine assemblies and other applications where manufacturing tolerances and/or part wear cause end-play between the abutting surfaces of the ring and the retained part. Such a ring is similar to a standard split retaining ring except that a surface portion thereof received in the groove is beveled, usually to a 15° angle. The ring retention groove has a corresponding bevel on the load bearing groove wall to seat the received beveled surface, and the beveled ring surface is generally seated at least half way into the groove to provide sufficient contact area with the load bearing groove wall while allowing for adequate end-play takeup.

Beveled retaining rings may be of the internal or external type with the beveled edge located around the outer circumference of the former and around the inner circumference of the latter. Usually, the rings are of the tapered section type such as shown in U.S. Pat No. 2,509,081 to Bluth, so that they maintain their circularity under deformation. Such tapered rings may also have bent prongs abutting the retained part to exert spring pressure thereagainst as shown in German Pat. No. 852,319.

Heretofore, the beveled groove seating surface of the ring was produced, for example, by holding the ring in an appropriate fixture and then using a surface grinder to obtain the desired beveled profile. However, currently such beveled rings are produced through a coining operation which requires substantial technical expertise and capital investment. In either case, such methods have proved to be relatively slow and expensive.

SUMMARY OF THE INVENTION

The principal object of the present invention is to eliminate the coining or bias grinding procedures by forming a beveled or inclined groove seating flange of the ring by bending or stamping the radially inner or outer circular edge of a flat, split, tapered section ring body at the desired inclined angle to the plane of the ring. In addition, the radially inner or outer body edge portion is bent twice in opposite directions so that the terminal portion thereof lies substantially in the plane of the ring body surface abutting the retained part. Such double bend eliminates the need for a subsequent grinding operation because the resulting beveled edge received in the groove does not project beyond the plane of the ring body abutting the retained part, thus preventing interference between the outer bent flange and the retained part. Alternately, the ring body may be indented to form a part bearing surface that is coplanar with the terminal portion of the bent beveled flange, thereby similarly to eliminate the need for a subsequent grinding operation. Preferably the ring is formed in its unhardened state and is subsequently hardened by heat treating.

It is another object of the present invention to provide a ring of uniform section from end to end having a scalloped profile thereon to maintain its circularity under deformation. To this end, the scalloped profile is formed by a plurality of circumferentially spaced semicircular grooves along the periphery of the ring, which progressively increase in depth from the middle section to the free ends of the ring, with such grooves maintaining the ring circularity under deformation instead of the standard tapered body cross section for such purpose. The prongs between the semicircular grooves are bent to the desired angle to form the beveled flange. This type of beveled ring not only facilitates high speed production and reduction of cost, but greatly reduces tool wear and design problems.

Other objects and advantages of the present invention will become apparent as the following description proceeds.

To the accomplishment of the foregoing and related ends the invention, then, comprises the features hereinafter fully described and particularly pointed out in the claims, the following description and the anexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is an elevation of an external, split beveled retaining ring constructed in accordance with the invention employing the scalloped profile and an indented ring body to form a new part abutment surface;

FIG. 2 is a section of a typical part retaining assembly incorporating the split beveled retaining ring shown in FIG. 1, with the section of such ring being taken along section line 2—2 of FIG. 1;

FIG. 3 is an elevation of the dual bend, split bevel retaining ring constructed in accordance with another embodiment of the present invention; and FIG. 4 is a section of a typical part retaining assembly incorporating the dual bend, split bevel retaining ring of FIG. 3, with the section of such ring being taken along section line 4—4 of FIG. 3.

DESCRIPTION OF THE PREFERRED EMBODIMENTS

Referring now in greater detail to the drawings and initially to FIGS. 1 and 2, an external beveled retaining ring indicated generally at 10 is adapted to be sprung into a radially outwardly opening groove 12 in a shaft 14. The beveled retaining ring 10 is made from an open-ended or split ring body constructed from spring material such as spring steel and has uniform section height from end to end between concentric radially inner and outer arcuate edges 16 and 18, respectively. Further, the ring body 10 has a scalloped profile formed by a plurality of circumferentially spaced semicircular grooves 20 along the radially inner edge 16, such grooves 20 progressively increasing in depth from the middle section 22 to its free ends 24 and 26. Such free ends 24 and 26 are provided with radially outwardly projecting lugs 28 and 30, respectively, each of which has an aperture 32 for receiving the points of a tool operative to open the ring and increase its diameter so that it may be slipped around the outer diameter of the shaft 14 adjacent the end of retained part 34 and then released by the tool naturally to spring into shaft groove 12. Because of the variation in groove depth, which is uniformly increasing on both sides of center line 22, the ring 10 maintains its circularity under deformation.

It should be appreciated that the ring may have section heights which progressively decrease from its middle section to its free ends similar to the standard tapered ring. Due to the taper afforded by the progressively decreasing section heights, such type of ring will also maintain its circularity under deformation.

The ring 10 has beveled or inclined radially inner flanges 36 which have at one side thereof the inclined groove seating surface 38 of the ring. Customarily, the surface 38 is at a 15° angle relative to the planar sides 40 and 42 of the ring body, which sides are substantially normal to the ring axis 44.

In accordance with the present invention, the inclined groove-engaging surface 38 is formed initially by bending simultaneously the radially inner circular edge portion of the prongs 46 between grooves 20 to the desired angle. Preferably, the bent or beveled flange 36 is about one-third the radial extent of the ring at its greatest section height. At the same time or in a subsequent bending operation, the ring body 10 further is provided with a plurality of circumferentially spaced indentations 48 which form substantially coplanar projecting surfaces 50 at their part retaining side with the terminal portions of the groove seating flanges. Such bending may be accomplished, for example, by stamping the ring, preferably in its unhardened state, between suitable dies. The ring may then be hardened, as by heat-treating, to obtain the desired properties.

Upon tool release, seating surface 38 of the ring 10 abuts annular load bearing wall 52 of the groove 12, with such groove wall 52 being inclined at the same angle of inclination as the inclined surface 38 of the ring to form complementary abutting surfaces. Further, the retained part 34 abuts the projecting surfaces 50 without interference from the bent prongs 46 forming the groove seating flanges 36. Accordingly, the ring 10 acts as a wedge between the groove wall 52 and the retained part 34. Moreover, the thickness and diameter of the ring and the width of the groove are so dimensioned that the ring is stressed to a diameter greater than its normal or unstressed diameter to which it tends to contract. Thus the ring's spring action causes the ring to seat more deeply in the groove compensating for end-play.

As another means to avoid grinding, the prongs (or arcuate edge portion) may be bent twice in opposite directions so that the terminal portions of the prongs are coplanar with the ring body. As best shown in FIGS. 3 and 4 for an internal ring 56, the circumferentially spaced prongs 58 are bent by stamping or the like in two directions to form a V-shape configuration having a first flange leg 60 and a second, rebent flange leg 62. The second leg 62 forms groove seating surface 64 that is in abutment with the complementary load bearing wall 66 of seating groove 68, with the dual bend permitting the flange to be inserted more than half way into the groove. As thus assembled, the inserted flange does not interfere with the retained part 70 because the terminal portion of second leg 62 is substantially coplanar with the part abutment surface 72 of the ring body.

Preferably, the dual bend flange ring 56 has the scalloped profile shown on a uniform section ring since in most cases the standard tapered section ring does not have sufficient radial extent to permit a dual bend and still yield satisfactory bearing area. The scalloped profile ring having circumferentially spaced single or dual bend groove-engaging surfaces on each of the prongs has been found to provide satisfactory load capacity. In addition, the dual bend ring functions as a combination of resilient and rigid end-play take-up due to the possibility of the double bend area flexing under load.

Other modes of applying the principles of the invention may be employed, change being made as regards the details described, provided the features stated in any of the following claims or the equivalent of such be employed.

The embodiments of the invention in which an exclusive property or privilege is claimed are defined as follows:

1. A split retaining ring comprising a generally circular body having a plurality of circumferentially spaced grooves in the radially inner or outer edge of said body, said grooves being divided by prongs which are uniformly bent at an abgle to the ring body to form groove reception flanges having inclined groove seating surfaces, said prongs being uniformly bent twice in opposite directions to form V shape members with the free legs thereof forming the groove reception flanges which are substantially coplanar at the ends thereof with one sidewall of the ring body.

2. The split retaining ring of claim 1 wherein said body has a uniform cross section from end to end, and said grooves increase in depth from the center to the free ends of the ring body to maintain the circularity of the same during distortion of the ring.

3. A split retaining ring comprising a generally circular body having a plurality of circumferentially spaced grooves in the radially inner or outer edge of said body, said grooves being divided by prongs which are uniformly bent at an angle to the ring body to form groove reception flanges having inclined groove seating surfaces, and a plurality of circumferentially spaced projecting surfaces extending axially from one sidewall of said ring body, said projecting surfaces being substantially coplanar with the free terminal portions of the inclined groove reception flanges.

4. The split retaining ring of claim 3 wherein said projecting surfaces on said body are in radial alignment with said prongs and radially spaced therefrom.

5. The split retaining ring of claim 3 wherein said body has a uniform cross section from end to end, and said grooves increase in depth from the center to the free ends of said body to maintain the circularity of the same during distortion of the ring.

6. A method of forming a beveled split retaining ring including a ring body and a plurality of circumferentially spaced grooves along the radially inner or outer edge of the ring body divided by prongs comprising the step of uniformly bending the prongs between the grooves to form a beveled groove seating flange having an inclined seating surface, said prongs being bent twice in different directions so that the free ends thereof are substantially coplanar with one sidewall of the ring body.

7. The method of claim 6 wherein the ring body has a uniform cross section from end to end, and the grooves increase in depth from the center to the free ends of the ring body.

8. A method of forming a beveled split retaining ring comprising the steps of uniformly bending a radially inner or outer edge portion of the ring body relative to the plane of the ring body to form a beveled groove seating flange having an inclined seating surface, and forming a plurality of circumferentially spaced projecting surfaces on the ring body extending axially from one sidewall of the ring body, said projecting surfaces being substantially coplanar with the free terminal portion of the beveled groove seating flange.

9. The method of claim 8 wherein the projecting surfaces are formed by providing a plurality of indentations in the other sidewall of the ring body directly opposite the projecting surfaces.

10. The method of claim 9 wherein there are a plurality of circumferentially spaced grooves along the radially inner or outer edge of the ring body which are divided by prongs uniformly bent to form such beveled groove seating flange, and the indentations and thus the projecting surfaces are formed in the ring body in radial alignment with the prongs and radially spaced therefrom.

* * * * *